United States Patent
Karlgaard (10) Patent No.: US 12,412,135 B2
(45) Date of Patent: Sep. 9, 2025

(54) PEAK CONSUMPTION MANAGEMENT FOR RESOURCE DISTRIBUTION SYSTEM

(71) Applicant: Landis+Gyr Innovations, Inc., Alpharetta, GA (US)

(72) Inventor: Matthew Donald Karlgaard, Brainerd, MN (US)

(73) Assignee: Landis+Gyr Technology, Inc., Alpharetta, GA (US)

( * ) Notice: Subject to any disclaimer, the term of this patent is extended or adjusted under 35 U.S.C. 154(b) by 169 days.

(21) Appl. No.: 17/944,479

(22) Filed: Sep. 14, 2022

(65) Prior Publication Data
US 2024/0086792 A1  Mar. 14, 2024

(51) Int. Cl.
*G06Q 10/0631* (2023.01)

(52) U.S. Cl.
CPC ................ *G06Q 10/0631* (2013.01)

(58) Field of Classification Search
None
See application file for complete search history.

(56) References Cited

U.S. PATENT DOCUMENTS

| | | | |
|---|---|---|---|
| 8,078,431 B2 * | 12/2011 | Brown | G06Q 10/06 702/57 |
| 2010/0179862 A1 * | 7/2010 | Chassin | G06Q 30/0282 705/347 |
| 2011/0063126 A1 * | 3/2011 | Kennedy | H04L 12/14 340/870.02 |
| 2013/0038468 A1 * | 2/2013 | Wang | G08B 25/10 340/870.02 |

(Continued)

FOREIGN PATENT DOCUMENTS

| | | | |
|---|---|---|---|
| AU | 2018210158 A1 * | 8/2019 | .......... G05B 15/02 |
| CA | 2749628 A1 | 2/2012 | |

(Continued)

OTHER PUBLICATIONS

Lin, Sheng-Kai, and Chao-Rong Chen. "Optimal energy consumption scheduling in home energy management system." 2016 international conference on machine learning and cybernetics (ICMLC). vol. 2. IEEE, 2016. (Year: 2016).*

(Continued)

*Primary Examiner* — Thomas L Mansfield
(74) *Attorney, Agent, or Firm* — Kilpatrick Townsend & Stockton LLP (57) ABSTRACT

A computer-implemented method includes assigning, by a peak management system, a peak resource management schedule to a first premises and a second premises within a resource distribution network. The peak resource management schedule includes a first peak consumption period and a first limited resource consumption period for the first premises and a second peak consumption period and a second limited resource consumption period for the second premises, where the first peak consumption period and the second peak consumption period are different. The method also includes transmitting, by the peak management system, a peak resource management signal to the first premises and the second premises. The peak resource management signal includes instructions to commence execution of the peak resource management schedule at the first premises and the second premises.

13 Claims, 8 Drawing Sheets

(56) References Cited

U.S. PATENT DOCUMENTS

| | | | |
|---|---|---|---|
| 2018/0204293 A1 | 7/2018 | Bazhinov | |
| 2019/0212802 A1* | 7/2019 | Srinivasan | G06Q 50/06 |
| 2019/0390977 A1* | 12/2019 | Frader-Thompson | G06Q 30/0277 |
| 2021/0221247 A1* | 7/2021 | Daniel | G06Q 10/06 |
| 2023/0418346 A1* | 12/2023 | Matthews | G06Q 50/06 |

FOREIGN PATENT DOCUMENTS

| | | | | |
|---|---|---|---|---|
| CA | 2749373 C | * | 4/2017 | G06Q 10/06 |
| CA | 2749659 C | | 10/2017 | |
| WO | WO-03007120 A2 | * | 1/2003 | G06Q 30/018 |

OTHER PUBLICATIONS

Rehman, Ateeq Ur, et al. "An optimal power usage scheduling in smart grid integrated with renewable energy sources for energy management." IEEE Access 9 (2021): 84619-84638. (Year: 2021).*

Ullah, Ihsan, et al. "An incentive-based optimal energy consumption scheduling algorithm for residential users." Procedia computer science 52 (2015): 851-857. (Year: 2015).*

Mahapatra, Chinmaya, Akshaya Kumar Moharana, and Victor CM Leung. "Energy management in smart cities based on internet of things: Peak demand reduction and energy savings." Sensors 17.12 (2017): 2812. (Year: 2017).*

PCT Patent Application No. PCT/US2023/073913, International Search Report and Written Opinion, Jan. 17, 2024, 17 pages.

* cited by examiner

PEAK CONSUMPTION MANAGEMENT FOR RESOURCE DISTRIBUTION SYSTEM

TECHNICAL FIELD

The present disclosure is generally related to consumption management of a resource distribution system. More particularly, but not by way of limitation, the present disclosure is related to managing premises consumption of a resource during a period of peak consumption.

BACKGROUND

In a resource distribution system, such as an electric grid that delivers electric power, extreme weather or critical peak demand periods may result in consumer demand that outpaces resource production capabilities. Because sufficient resources may not be available during these periods to meet the entire resource demand, resource distribution systems may implement rolling outages to avoid system-wide blackouts. Rolling outages may be difficult to manage and generally inequitable across all premises served by the resource distribution system. An alternative to rolling outages to avoid management and inequity concerns may be useful in driving the management of utility assets in a resource distribution system.

SUMMARY

In one implementation, a system includes a metering device, a processor, and a non-transitory, computer-readable memory that includes instructions executable by the processor for causing the processor to perform operations. The operations include accessing a peak resource management schedule. The operations also include receiving a peak resource management signal comprising instructions to commence execution of the peak resource management schedule at a premises. Additionally, the operations include controlling the metering device to monitor premises resource consumption at the premises. Further, the operations include determining that a peak resource consumption portion of the peak resource management schedule is active. The operations further include, in response to determining that the peak resource consumption portion is active, controlling the premises resource consumption at the premises to below a peak resource consumption level of the peak resource management schedule. Furthermore, the operations include determining that a limited resource consumption portion of the peak resource management schedule is active. Moreover, the operations include, in response to determining that the limited resource consumption portion is active, controlling the premises resource consumption at the premises to below a non-zero, limited resource consumption level of the peak resource management schedule.

In another implementation, a computer-implemented method includes assigning, by a peak management system, a peak resource management schedule to a first premises and a second premises within a resource distribution network. The peak resource management schedule includes a first peak consumption period and a first limited resource consumption period for the first premises and a second peak consumption period and a second limited resource consumption period for the second premises, where the first peak consumption period and the second peak consumption period are different. The method also includes transmitting, by the peak management system, a peak resource management signal to the first premises and the second premises. The peak resource management signal includes instructions to commence execution of the peak resource management schedule at the first premises and the second premises.

In another implementation, a non-transitory computer-readable medium may include instructions that are executable by a processor for causing the processor to perform operations. The operations include accessing a peak resource management schedule. The operations also include receiving a peak resource management signal comprising instructions to commence execution of the peak resource management schedule at a premises. Additionally, the operations include controlling the metering device to monitor premises resource consumption at the premises. Further, the operations include determining that a peak resource consumption portion of the peak resource management schedule is active. The operations further include, in response to determining that the peak resource consumption portion is active, controlling the premises resource consumption at the premises to below a peak resource consumption level of the peak resource management schedule. Furthermore, the operations include determining that a limited resource consumption portion of the peak resource management schedule is active. Moreover, the operations include, in response to determining that the limited resource consumption portion is active, controlling the premises resource consumption at the premises to below a non-zero, limited resource consumption level of the peak resource management schedule.

BRIEF DESCRIPTION OF THE DRAWINGS

These and other features, aspects, and advantages of the present disclosure are better understood when the following Detailed Description is read with reference to the accompanying drawings.

DETAILED DESCRIPTION

The present disclosure describes techniques for peak consumption management of a resource distribution system.

In an example, peak consumption management of a resource distribution system may be provided by distributing a peak resource management schedule from the resource distribution system to premises within the resource distribution system. Each premises within the resource distribution system may be assigned alternating time periods for peak resource consumption and limited resource consumption. Upon receipt of the resource management schedule and instructions to commence execution of the peak resource management schedule at the premises, each premises may control resource consumption in a manner that does not exceed the consumption levels established by the peak resource consumption and the limited resource consumption time periods. By staggering the occurrence of these time periods across all premises within the resource distribution system, a maximum consumption level of the resource distribution system may be reduced from typical resource consumption periods, and the premises may avoid experiencing rolling outages during extreme weather or critical peak consumption periods.

Illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

Figure 1:
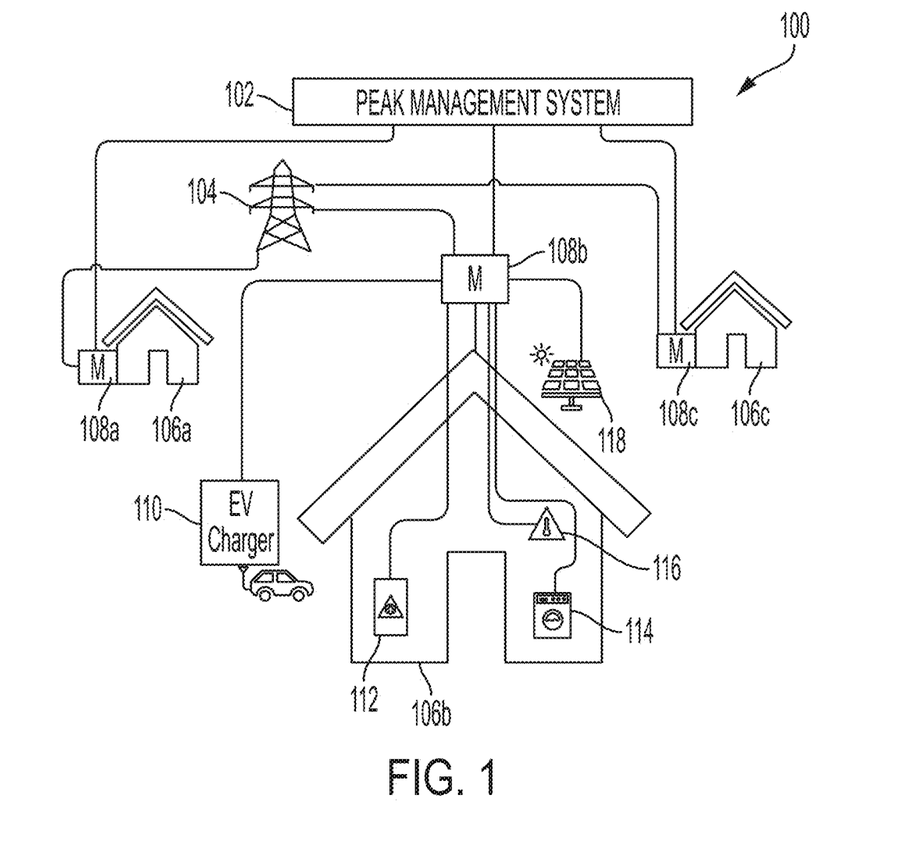
FIG. 1 illustrates an example of a resource distribution network, according to some implementations described herein.

FIG. 1 illustrates an example of a resource distribution network 100, according to some implementations described herein. The resource distribution network 100 may include a peak management system 102, a resource distribution system 104, and a plurality of premises 106a, 106b, and 106c. While the resource distribution network 100 is described herein as a being part of a power distribution environment, other utility systems may incorporate similar peak management system 102. For example, the peak management system 102 may be employed in a gas, water, or other utility distribution environment.

The resource distribution system 104 may provide power to the premises 106 for consumption by the premises 106. The amount of power that is distributable to the premises 106 may be limited by a power generation capacity of a power plants that generate power for the resource distribution system 104. In some examples, extreme weather or critical peak periods may result in consumption demand by the premises 106 that exceeds the power generation capacity of the resource distribution system 104. To avoid rolling outages at the premises 106 during such periods, the peak management system 102 may implement a peak resource management schedule.

The peak resource management schedule implemented by the peak management system 102 may include schedules of resource consumption by the premises 106 during a peak demand period of the resource distribution network 100. In an example, the peak resource management schedule may include at least two consumption levels. For example, each of the premises 106 may be assigned a peak resource consumption period and a limited resource consumption period.

In some examples, all of the premises 106 in the resource distribution network 100 may be assigned one of two or more different peak resource management schedules. In such an example, the peak resource consumption periods may be staggered among the multiple peak resource management schedules such that the peak resource consumption periods of the peak resource management schedules do not overlap. In an example with three or more peak resource management schedules, the peak resource consumption periods of the various schedules may not substantially overlap, but the limited resource consumption periods may overlap with other limited resource consumption periods. As used herein, the term "substantially" may refer to a value that is within 10% of another value. Accordingly, if a peak resource consumption period is 1 hour in length, then the active peak resource consumption period may not overlap with other peak resource consumption periods of other peak resource management schedules for more than 6 minutes within any given hour.

The peak management system 102 may assign the peak resource management schedules to metering devices 108a, 108b, and 108c of the premises 106a, 106b, and 106c, respectively. In an example, each of the metering devices 108a, 108b, and 108c may receive a different peak resource management schedule such that the peak resource consumption periods of each of the premises 106a, 106b, and 106c are staggered. When the peak management system 102 activates the peak resource management schedules, the metering devices 108 may control various components of the premises 106 to limit resource consumption at the premises 106 to levels that are below the peak resource consumption level and the limited resource consumption levels depending on an active period of the peak resource management schedule.

For example, the metering device 108b may limit operation of devices that contribute the most to resource consumption at the premises when the limited resource consumption period is active. Examples of the devices that may be controlled to a limited amount of consumption may include electric vehicle (EV) chargers 110, refrigerators 112, washers and dryers 114, and heating, ventilation, and air conditioning (HVAC) systems 116. Other devices may also be limited during the limited resource consumption period. For example, any IoT device that is communicatively coupled to the metering device 108 may be controlled to limit consumption during the limited resource consumption period. In some examples, the metering devices 108 may control devices to not consume power at all when the limited resource consumption period is active. In additional examples, the metering devices 108 may control devices to consume less, but still some, power when the resource consumption period is active. Additionally, the metering device 108 may meter energy producing devices, such as a solar panel 118, and adjust control of the other premises devices based on a net level of consumption by devices at the premises 106.

In some examples, an owner, resident, or user of the premises 106 may designate priority levels for various devices at the premises 106 for the metering device 108 to limit resource consumption during the limited resource consumption period. For example, the HVAC system 116 may have a higher priority in a region that experiences high levels of heat when the premises 106 is occupied than the washers and dryers 114. Accordingly, the metering device 108 may limit resource consumption by the washers and dryers 114 during the limited resource consumption period before controlling HVAC system 116 to reduce resource consumption to a designated level.

During the peak resource consumption period, the metering device 108 may reintroduce devices that were limited during the limited resource consumption period based on priority levels of the devices. For example, the highest priority level device that was previously limited may be fully reactivated before a next highest priority level device. This process may continue until all of the previously limited devices have been reactivated or until a peak resource consumption amount is reached at the premises 106, whichever occurs first. In other words, during the peak resource consumption period, the premises 106 may consume power at typical resource consumption levels or near typical resource consumption levels.

While the premises 106 in FIG. 1 are each described as being enrolled in the peak resource management schedules, in some examples, not all of the premises 106 of the resource distribution network 100 may be enrolled in the peak resource management schedules. For example, some metering devices within the resource distribution network 100 may not be compatible with the peak resource management schedules or the peak management system 102. Further, in some examples, the peak resource management schedules among premises 106 within resource distribution groupings of the resource distribution network 100 may be evenly distributed. In other words, by distributing the peak resource management schedules within the distribution groupings, the resource distribution network 100 may ensure that the premises 106 in one resource distribution grouping are not all on the same peak resource management schedule even if a similar number of premises 106 in another resource distribution grouping are on a different peak resource management schedule. This may ensure that various resource distribution groupings of the resource distribution network 100 are not overloaded during implementation of the peak resource management schedules.

Figure 2:
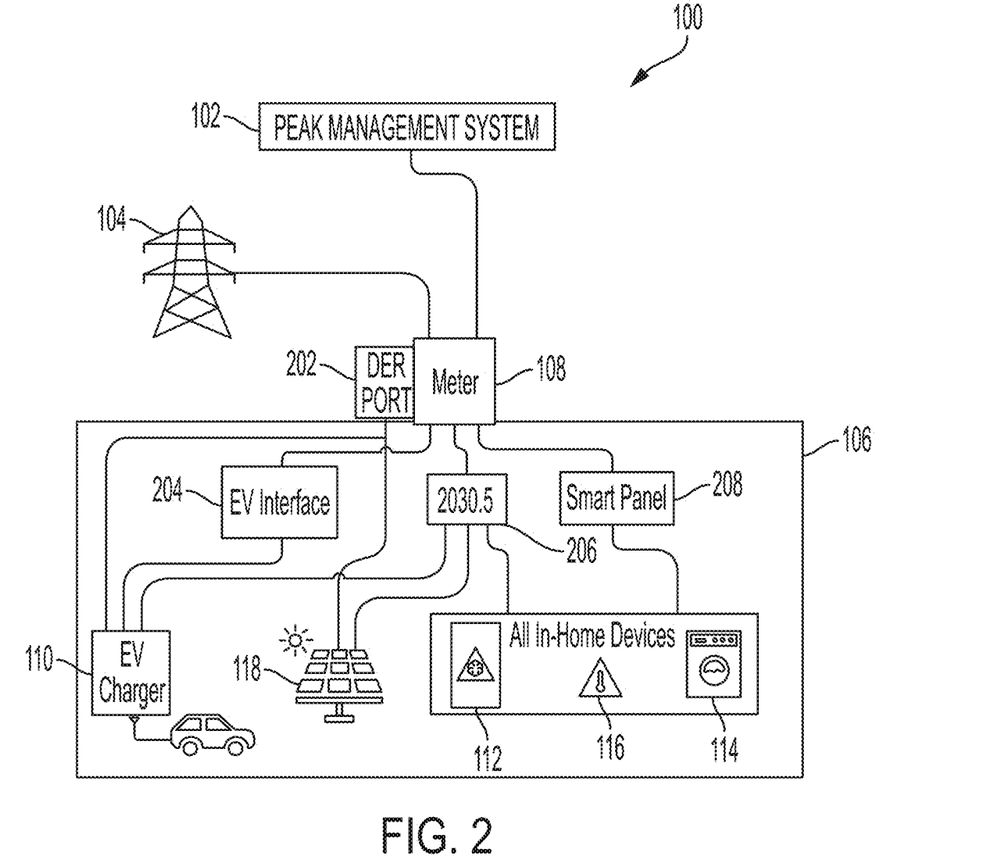
FIG. 2 illustrates an example of a premises forming part of the resource distribution network of FIG. 1, according to some implementations described herein.

FIG. 2 illustrates an example of the premises 106 forming part of the resource distribution network 100, according to some implementations described herein. To manage the premises load under a limit established by the peak resource management schedule of the premises 106, the metering device 108 may use various interfaces to control loads at the premises 106 to remain under the peak resource consumption limit and the limited resource consumption limit of the peak resource management schedule. For example, the metering device 108 can include a distributed energy resources (DER) port 202 that provides a mechanism for the metering device 108 to meter resource generation by the solar panel 118, meter energy flow to or from the EV charger 110, or meter other distributed energy resource components by the metering device 108. As discussed above with respect to FIG. 1, the net consumption detected by the metering device 108 (e.g., premises resource consumption minus premises resource generation) may be used to control consumption by other devices in the premises 106.

An EV interface 204 may provide communication from the metering device 108 to control the EV charger 110. Because charging an electric vehicle may consume a significant amount of power, the EV interface 204 may provide a communication interface between the metering device 108 and the EV charger 110 to control times when the EV charger 110 is active. For example, the metering device 108 may control the EV charger 110 to charge an electric vehicle only during peak resource consumption periods when the peak resource management schedule is active. In an example, the metering device 108 can also control, through the EV interface 204, energy exporting from the electric vehicle through the DER port 202 during a limited resource consumption period. In other words, the electric vehicle may charge and store energy during peak resource consumption periods and sell energy back to the resource distribution system 104 during limited resource consumption periods. In some examples, the peak management system 102 may encourage premises with distributed generation (e.g., solar panels) or storage (e.g., electric vehicles) to export energy at critical times, such as peak times, by offering a price premium on the energy exported from the distributed generation and storage.

In an additional example, an IEEE 2030.5 interface 206 or similar may provide an interface for the metering device 108 to control the loads of the premises 106. The 2030.5 interface 206 may provide a communication interface for the EV charger 110, the solar panel 118, the refrigerator 112, the washer and dryer 114, and the thermostat 116. In an additional example, the metering device 108 may control the refrigerator 112, the washer and dryer 114, and the HVAC system 116, and other large loads at the premises 106 using a smart panel 208. For example, the metering device 108 can control switches of the smart panel 208 to prevent various loads at the premises 106 from operating, thereby limiting resource consumption at the premises 106 during peak resource consumption periods and limited resource consumption periods. In some examples, the devices of the premises 106 may communicate with the metering device 108 through the interfaces using Wi-Fi, Bluetooth, or other communication protocols. While the EV interface 204, the 2030.5 interface 206, and the smart panel 208 are described herein as interfaces for controlling the operation of loads to reduce resource consumption, other interfaces may also be used to perform similar functions.

In some examples, implementation of the peak resource management schedule by the metering device 108 may take into account expected demand for controlled loads of the premises 106 (e.g., the EV charger 110, the refrigerator 112, the washer and dryer 114, and the HVAC system 116) and uncontrolled loads of the premises 106 (e.g., any other loads that are not controllable directly by the metering device 108). Further, the peak management system 102 may provide incentives that encourage energy exporting from the solar panels 118 or onsite energy storage devices including battery storage, electric vehicles, and other energy storage devices during critical peak periods. For example, the peak management system 102 may provide an enhanced rate for energy exporting during critical peak periods to encourage an owner of a premises 106 to sell energy back to the resource distribution system 104. Additionally, the peak management system 102 may provide a price structure that incentivizes a reduction in resource consumption below specified limits by providing monetary rewards for specific actions, such as maintaining resource consumption less than a further limited level from the peak resource management schedule.

Further, in some examples, the peak resource management schedule may include limiting specific loads during the peak resource consumption period. For example, the peak resource management schedule may include an indication that the EV charger 110 cannot draw power or cannot draw full power from the resource distribution network 104 during the peak resource consumption period. Other devices may also be similarly limited during the peak resource consumption period.

Figure 3:
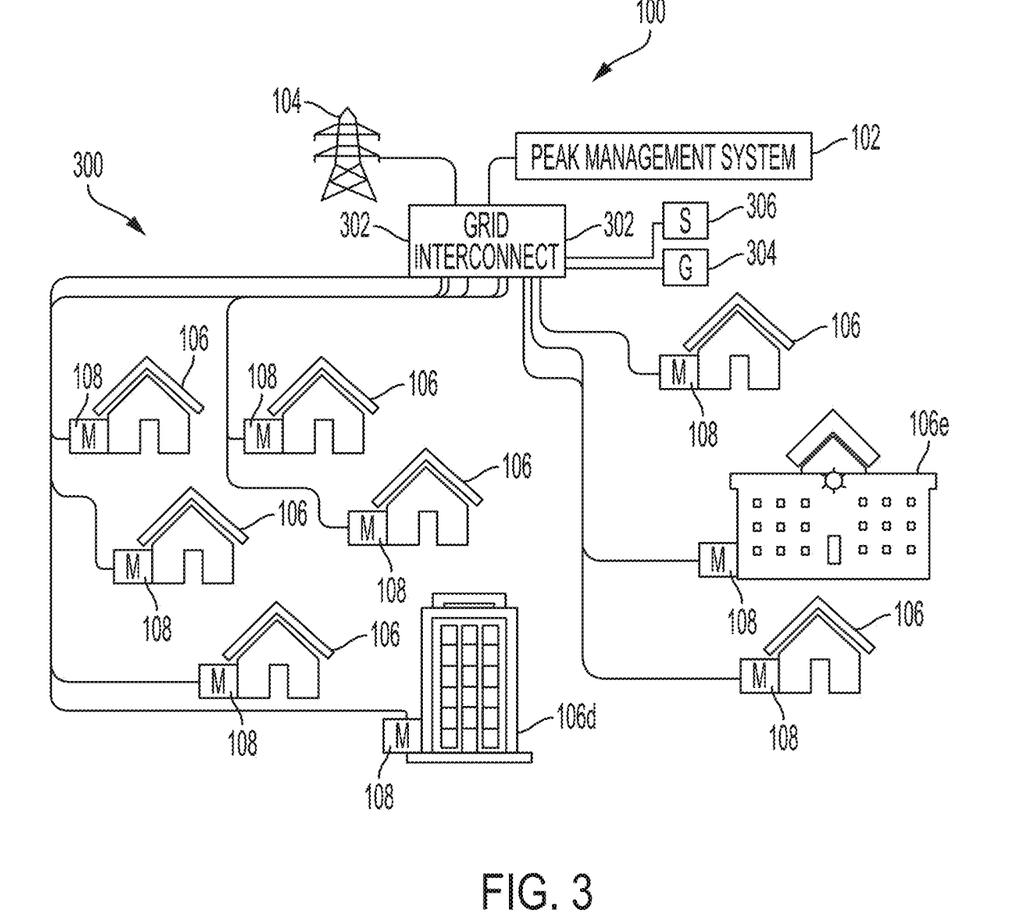
FIG. 3 illustrates an example of a microgrid forming part of the resource distribution network of FIG. 1, according to some implementations described herein.

FIG. 3 illustrates an example of a microgrid 300 forming part of the resource distribution network 100, according to some implementations described herein. The microgrid 300 may include the peak management system 102, the resource distribution system 104, and a plurality of premises 106. The resource distribution system 104 may provide power to the premises 106 for consumption by the premises 106. The premises 106 may include homes, hospitals, retail stores, grocery stores, restaurants, office buildings, schools, municipal buildings (e.g., police stations, fire stations, courthouses, etc.), or any other buildings making up the microgrid 300 with metering devices 108. The amount of power that is distributable to the premises 106 from the resource distribution system 104 may be limited by a power generation capacity of a power plant that generate power for the resource distribution system 104. In some examples, extreme weather or critical peak periods may result in consumption demand by the premises 106 that exceeds the power generation capacity of the resource distribution system 104. To avoid rolling outages at the premises 106 during such periods, the peak management system 102 may island the microgrid 300 and implement a peak resource management schedule. For example, the peak management system 102 may control a grid interconnect 302 between the microgrid 300 and the resource distribution system 104. The grid interconnect 302 enables isolation between the microgrid 300 and the resource distribution system 104 during critical resource periods. In some examples, the microgrid 300 may receive a microgrid resource management schedule from the grid-wide peak management system that assigns consumption limits for the microgrid 300 and other premises 106 that are not part of the microgrid 300. In some examples, the microgrid resource management schedule received from the grid-wide peak management system may establish a zero-consumption level for the microgrid 300 from the resource distribution system 104 for certain time periods. In other words, during the zero-consumption level, any power consumed at the microgrid 300 is generated or otherwise accessed from distributed energy resources of the microgrid 300. Additionally, the peak management system 102 of the microgrid 300 may provide peak resource management schedules to each premises 106 of the microgrid 300 based on the microgrid resource management schedule.

The microgrid 300 may have sufficient power generation 304 and energy storage 306 to maintain the premises 106 in the microgrid 300 at a limited overall load. The power generation 304 may include any type of distributed energy generation by the microgrid 300, such as solar, wind, and hydro power plants, as well as fuel-based generation (e.g., natural gas and diesel generation) and other fuel and renewable generation sources. The energy storage 306 can be any energy storage devices associated with the microgrid 300. In some examples, the energy storage 306 may include electric vehicles at the premises 106 or other battery cells capable of storing energy. In some examples, one or more of the premises 106 in the microgrid 300 may include the power generation 304 and the energy storage 306. Management of the power generation 304 and the energy storage 306 at the premises 106 may be performed at the individual premises level and as an aggregated resource of the microgrid 300.

The peak management system 102 may further limit an overall load of the microgrid 300 by implementing a peak resource management schedule for the microgrid 300. Similar to the peak resource management schedule discussed above with respect to FIG. 1, the peak resource management schedule implemented by the peak management system 102 may include schedules of resource consumption by the premises 106 during a peak demand period of the resource distribution network 100. The peak resource management schedule may include at least two consumption levels. For example, each of the premises 106 may be assigned a peak resource consumption period and a limited resource consumption period.

In some examples, all premises 106 in the resource distribution network 100 may be assigned one of two or more different peak resource management schedules. In such an example, the peak resource consumption periods may be staggered among the multiple peak resource management schedules such that the peak resource consumption periods of the peak resource management schedules do not overlap. In an example with three or more peak resource management schedules, the peak resource consumption periods of the various schedules may not substantially overlap, but the limited resource consumption periods may overlap with other limited resource consumption periods. As used herein, the term "substantially" may refer to a value that is within 10% of another value. Accordingly, if a peak resource consumption period is 1 hour in length, then the active peak resource consumption period may not overlap with other peak resource consumption periods of other peak resource management schedules for more than 6 minutes within any given hour.

The peak management system 102 may assign the peak resource management schedules to metering devices 108 of the premises 106. In an example, each of the metering devices 108 may receive one of several different peak resource management schedules such that the peak resource consumption periods are divided among the premises 106. When the peak management system 102 activates the peak resource management schedules, the metering devices 108 may control various components of the premises 106 to limit resource consumption at the premises 106 to levels that are below the peak resource consumption level and the limited resource consumption levels depending on an active period of the peak resource management schedule. The result may be that the overall consumption of the microgrid 300 remains below a level that is supportable by the power generation 304 of the microgrid 300 when the microgrid is islanded from the resource distribution system 104. In some examples, the microgrid 300 may export unused power generated by the power generation 304 or stored at the energy storage 306 to the resource distribution system 104 in exchange for a premium price of the energy during a critical resource period. In an additional example, the microgrid 300 may be provided with a schedule from the grid-wide peak management system that establishes certain time periods where the microgrid 300 is expected to export energy back to the grid. The schedule may be established by monetary incentives to the microgrid 300 or by an agreement for the microgrid 300 to provide a certain amount of energy per unit of time.

The premises level control of the microgrid 300 may be controlled in a manner similar to the premises level control of the premises 106 that are not in a microgrid, as discussed above with respect to FIGS. 1 and 2. For example, the metering devices 108 may limit operation of devices that contribute the most to resource consumption at the premises 106 when the limited resource consumption period is active. Examples of the devices that may be controlled to a limited amount of consumption may include electric vehicle chargers, refrigerators, washers and dryers, and heating, ventilation, and air conditioning (HVAC) systems. Other devices may also be limited during the limited resource consumption period. For example, any IoT device that is communicatively coupled to the metering device 108 may be controlled to limit consumption during the limited resource consumption period. Additionally, the metering device 108 may meter energy producing devices, such as a solar panel, and adjust control of the other premises devices based on a net level of consumption by devices at the premises 106.

In some examples, an owner, resident, or user of the premises 106 may designate priority levels for various devices at the premises 106 for the metering device 108 to limit resource consumption during the limited resource consumption period. For example, the HVAC system 116 may have a higher priority in a region that experiences high levels of heat when the premises 106 is occupied than the washers and dryers 114. Accordingly, the metering device 108 may limit resource consumption by the washers and dryers 114 during the limited resource consumption period before controlling HVAC system 116 to reduce resource consumption to a designated level.

During the peak resource consumption period, the metering device 108 may reintroduce devices that were limited during the limited resource consumption period based on priority levels of the devices. For example, the highest priority level device that was previously limited may be fully reactivated before a next highest priority level device. This process may continue until all of the previously limited devices have been reactivated or until a peak resource consumption amount is reached at the premises 106, whichever occurs first. In other words, during the peak resource consumption period, the premises 106 may consume power at typical resource consumption levels or near typical resource consumption levels.

In some examples, some of the premises 106 in the microgrid 300, or in the overall resource distribution network 100, may not be subject to the peak resource management schedules. For example, a premises 106d, which may be a commercial building, may not be on the peak resource management schedules, or may have a different triggering event for placement on the peak resource management schedules. Similarly, a premises 106e, which may be a school or a hospital, may not be on the peak resource management schedules. By avoiding the peak resource management schedules for select premises 106d and 106e, some premises that provide critical infrastructure may continue to operate under normal operating conditions to meet a critical infrastructure goal of the premises.

Figure 4:
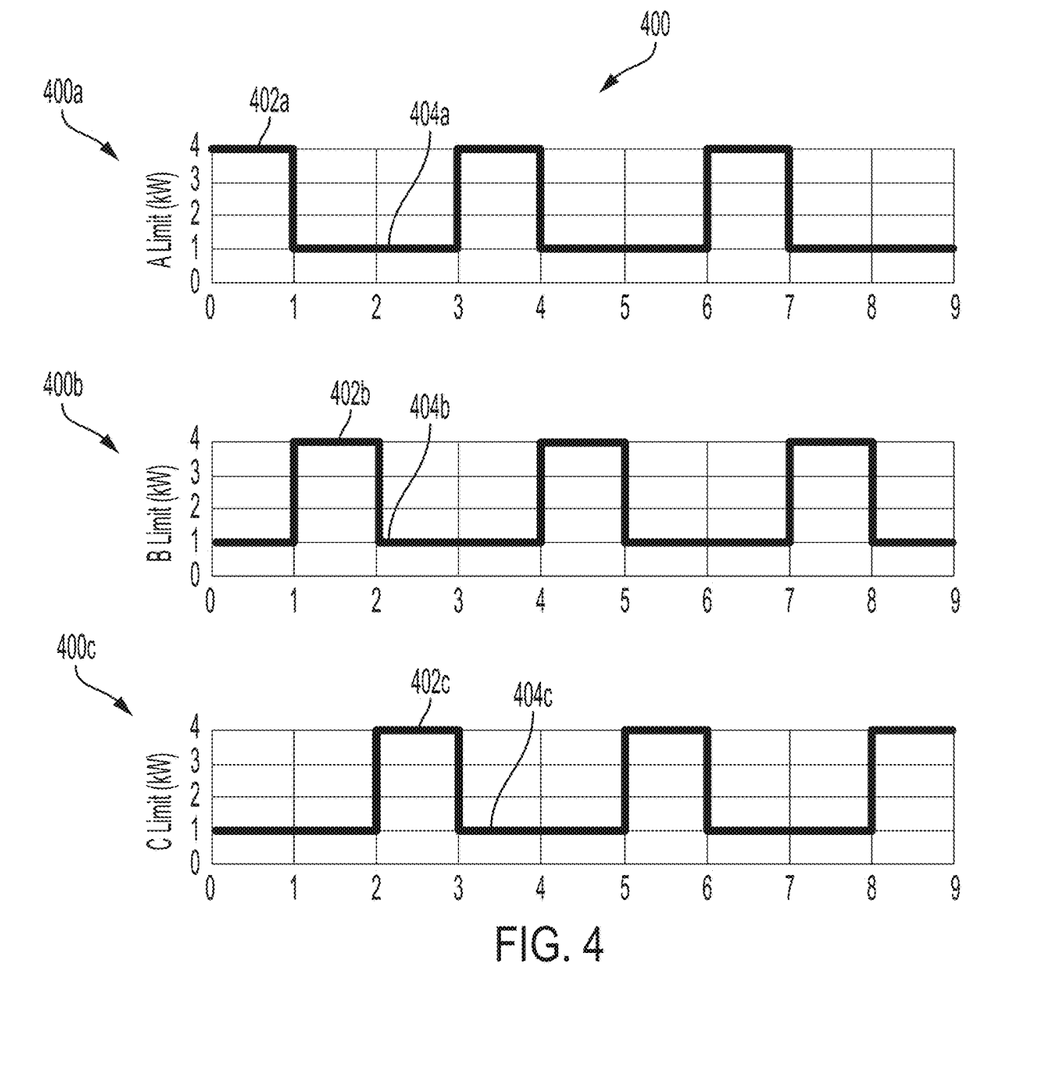
FIG. 4 is an example of a peak resource management schedule assigned to premises of the resource distribution network of FIG. 1, according to some implementations described herein.

FIG. 4 is an example of a peak resource management schedule 400 assigned to the premises 106 of the resource distribution network 100, according to some implementations described herein. As depicted, the peak resource management schedule 400 include three individual schedules 400a, 400b, and 400c. Each of the schedules 400 may be assigned to a number of premises 106 within the resource distribution network 100 or within the microgrid 300. While three individual schedules are depicted in the peak resource management schedule 400, more or fewer individual schedules can also be used for the premises 106 of the resource distribution network 100. At a microgrid level, similar schedules to the schedules 400 may be applied. In some examples, amounts of permissible energy consumption may be established for the premises 106 of the microgrid 300 that are different from amounts of permissible energy consumption for the premises 106 of the resource distribution network 100.

Each of the individual schedules 400a, 400b, and 400c include peak resource consumption periods 402a, 402b, and 402c, respectively, and limited resource consumption periods 404a, 404b, and 404c, respectively. The peak resource consumption periods 402 and the limited resource consumption periods 404 may be defined by a power limit in kilowatts over a specified period of time. As illustrated in the example depicted in FIG. 4, the peak resource consumption periods 402 have a limit of four kilowatts, and the limited resource consumption periods 404 have a limit of one kilowatt. When the individual schedules 400a, 400b, and 400c are evenly divided among all of the premises 106 within the resource distribution network 100, the average consumption limit per premises 106 of the resource distribution network 100 is two kilowatts. This average consumption limit may be increased or decreased by adjusting the limits of the peak resource consumption periods 402 and the limited resource consumption periods 404, the timing of the peak resource consumption periods 402 and the limited resource consumption periods 404, or a combination thereof. While FIG. 4 depicts the schedules 400 with specific limit values and times, the specific values are for illustration purposes only. Other specific limit values and times may be used within the schedules 400 depending on parameters of the resource distribution network 100.

In an example, each of the premises 106 in the resource distribution network 100 may be assigned one of the individual schedules 400a, 400b, and 400c upon installation of a metering device 108 at a premises 106. In an additional example, the peak management system 102 may assign the individual schedules 400a, 400b, and 400c to the premises 106 upon initiating the peak resource management schedule 400. In some examples, the premises 106 with storage capabilities, such as electric vehicles, stationary batteries, and other energy storage devices or systems, may utilize the peak resource consumption periods 402 to charge batteries and discharge the batteries during the limited resource consumption periods 404 to maintain a more consistent level of resource consumption during the totality of the peak resource management schedule 400. In some examples, the schedules 400 may be part of an opt-in system, where the premises 106 are able to opt into receiving one of the individual schedules 400a, 400b, and 400c in exchange for incentives from a utility.

In some examples, multiple, different peak resource management schedules 400 may be assigned to the premises 106. For example, the different schedules 400 may be assigned based on an expected severity of the critical resource period. For example, the peak resource management system 102 may initiate a particular schedule 400 when a high temperature condition for a particular day is expected to be extreme, and the peak resource management system 102 may initiate a different particular schedule 400 when a high temperature condition for a different particular day is expected to be less than the extreme temperature condition. In such an example, the extreme weather schedule 400 may have a shorter or lower peak resource consumption period 402 and a longer or lower limited resource consumption period 404 than the peak resource consumption period 402 and limited resource consumption period 404 of the schedule 400 initiated on a more moderate weather day.

Figure 5:
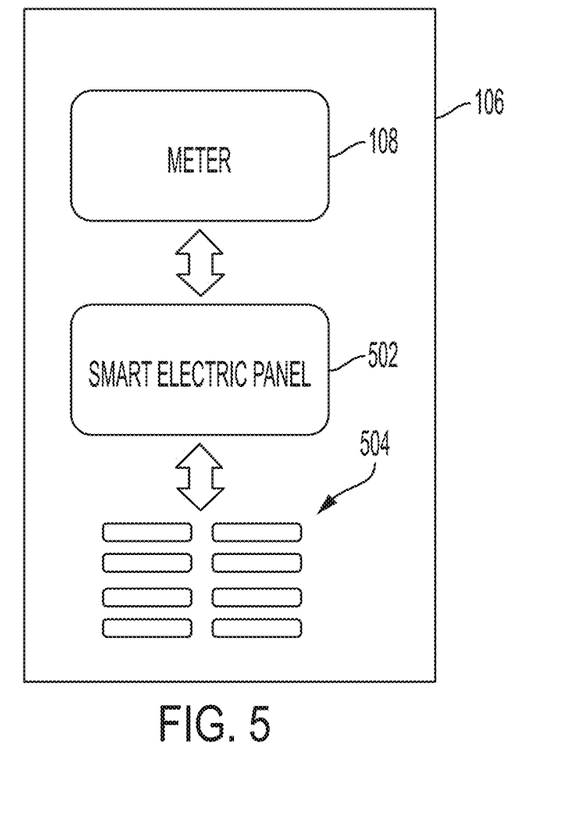
FIG. 5 is a schematic diagram of a metering device controlling premises power consumption with a smart electric panel, according to some implementations described herein.

FIG. 5 is a schematic diagram of a metering device 108 controlling premises power consumption with a smart electric panel 502, according to some implementations described herein. The metering device 108 may include a peak resource management schedule 400. To maintain the premises 106 within the limits of the peak resource management schedule 400, the metering device 108 may control the smart electric panel 502 to enable provision of power to various components 504 of the premises 106 controlled by the smart electric panel 502. For example, the components 504 can include individual components of the premises 106 such as an HVAC system, refrigerators, washers and dryers, etc. that may be controllable by an individual circuit breaker of the smart electric panel 502. In additional examples, the components 504 may include rooms or other-sized regions of the premises 106 that are controllable by individual circuit breakers of the smart electric panel 502.

The metering device 108 may control the smart electric panel 502 to remove application of power from particular components 504 at the premises 106 to maintain the premises 106 below the consumption limits of the peak resource management schedule 400. In some examples the smart electric panel 502 may prioritize the components 504 and intelligently control the application or removal of power to the various components 504 based on the priority of the components 504. In some examples, the metering device 108 can control the smart electric panel 502 while also directly controlling individual components of the premises 106. For example, the metering device 108 can control one or more resource consuming devices to reduce resource consumption to zero or to a non-zero level. The non-zero level may include a reduction from a peak consumption level of the one or more resource consuming devices.

Figure 6:
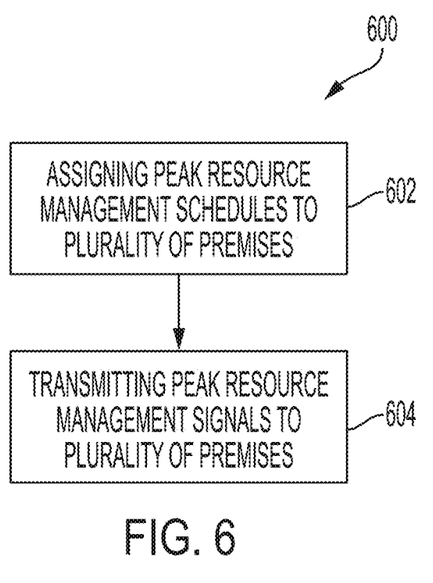
FIG. 6 is an example flowchart of a process for distributing a peak resource management schedule to premises of a resource distribution network, according to some implementations described herein.

FIG. 6 is an example flowchart of a process 600 for distributing the peak resource management schedule 400 to premises of the resource distribution network 100, according to some implementations described herein. At block 602, the process 600 involves assigning peak resource management schedules 400 to a plurality of premises 106. The plurality of premises 106 may include all or substantially all of the premises 106 within the resource distribution network 100. In an example, each of the premises 106 may be assigned one of a plurality of individual schedules that make up the peak resource management schedule 400. The premises 106 may be evenly or substantially evenly divided among the individual schedules of peak resource management schedule 400 to maintain equity among all of the premises 106 within the resource distribution network 100 while maintaining overall consumption of the resource distribution network 100 below resource producing capabilities of the resource distribution network 100.

At block 604, the process 600 involves transmitting peak resource management signals to the plurality of premises 106 of the resource distribution network 100 to initiate the peak resource management schedules 400 at the premises 106. For example, the peak resource management system 102 may transmit the peak resource management signals to the metering devices 108 of the premises 106. In some examples, the peak resource management system 102 may transmit the signals through a mesh network of the metering devices within the resource distribution network 100. In additional examples, other communication types, such as cellular communication networks, wide area networks, or combinations of communication networks, may be used to transmit the signals to the metering devices 108.

The peak resource management signals may be transmitted by the peak resource management system 102 when a determination is made that a critical resource period has commenced or will commence imminently. The signal may be an indication to the metering devices 108 that the peak resource management schedules 400 should commence. In some examples, the signal may be a single broadcast command from the peak resource management system 102 to initial the schedules 400 at all metering devices 108 within the resource distribution network 100. In an example, the broadcast time for a mesh network of the metering devices 108 may take approximately 10 minutes to reach all endpoints. Each of the metering devices 108 may be assigned a particular peak resource management schedule 400. The schedules 400 may be assigned based on local area network identification (LAN ID), geographical locations, or other parameters of the metering devices 108. The broadcast message from the peak resource management system 102 may be a command to initiate the pre-assigned schedules 400 at the metering devices 108.

Figure 7:
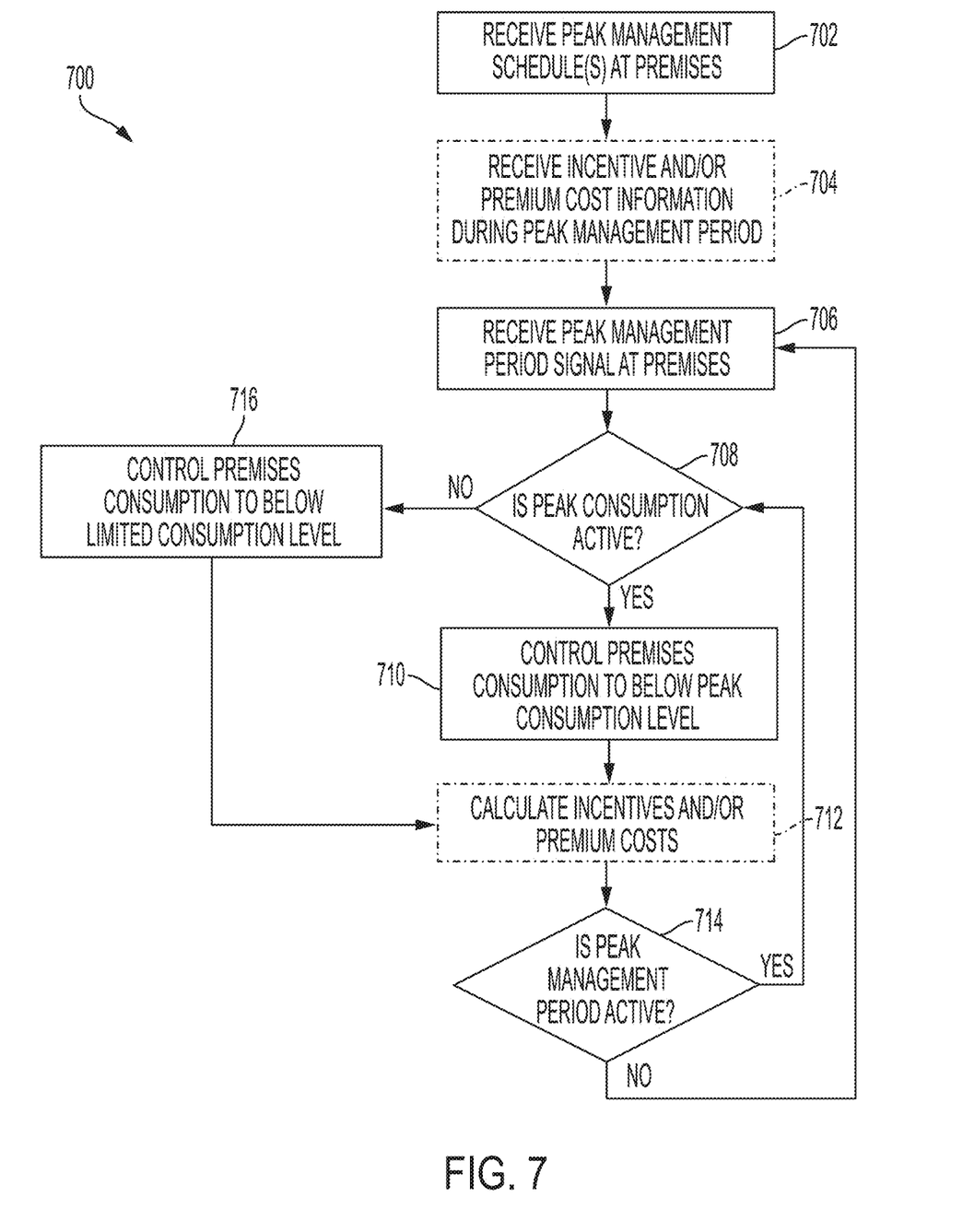
FIG. 7 is an example flowchart of a process for controlling premises power consumption using a peak resource management schedule, according to some implementations described herein.

FIG. 7 is an example flowchart of a process 700 for controlling premises power consumption using the peak resource management schedule 400, according to some implementations described herein. At block 702, the process 700 involves receiving one or more peak resource management schedules 400 at a premises 106. In an example, a metering device 108 of the premises 106 may be pre-assigned with the one or more peak resource management schedules 400. In additional examples, the metering device 108 may receive the schedules 400 from the peak management system 102.

At block 704, the process 700 involves receiving incentive information premium cost information, or both during a peak resource management period. The incentive information may include premium prices for selling energy back to the resource distribution network 100 during a peak management period, and the premium cost may include premium costs for exceeding usage limits established by the peak resource management schedules 400 during the peak resource management period. In some examples, the metering device 108 of the premises 106 may intelligently control consumption of by the premises 106 taking into account the premium information and the cost information.

At block 706, the process 700 involves receiving a peak management period signal at the premises 106. The peak management period signal may be an instruction for the metering device 108 to initiate the peak resource management schedule 400. In some examples, the peak management period signal may include an indication of a particular point in time in which the peak resource management schedule 400 should commence. By identifying the particular point in time for commencing the peak resource management schedule 400, each of the premises 106 may commence the schedule 400 in a manner that avoids unintended overlapping of peak resource consumption periods 402 for the premises 106 that include different schedules 400. In an example where the metering device 108 includes multiple schedules 400, the peak management period signal may identify a particular schedule 400 for the metering device 108 to initiate.

At block 708, the process 700 involves determining whether a peak resource consumption period 402 of the peak resource management schedule 400 is active at the premises 106. If the peak resource consumption period is active, then, at block 710, the process 700 involves controlling consumption of energy at the premises 106 below a peak consumption limit established by the peak resource consumption period 402 of the peak resource management schedule 400. In an example, the metering device 108 may take into account priority designations of various loads in the premises 106 to meet the peak consumption limit. For example, a higher priority load may remain in a consuming state until all lower priority loads have already been removed to meet the peak consumption limit.

At block 712, the process 700 involves calculating incentives for exporting power to the resource distribution network 100, premium costs for exceeding any resource consumption limits established by the peak resource management schedule 400, or both. For example, when the premises 106 sells power back to the resource distribution network 100, the incentive may be calculated based on the premium price associated with the peak management period. Likewise, when the premises 106 exceeds consumption limits of the schedule 400, the premium cost may be calculated based on a premium associated with exceeding the consumption limits. In some examples, this information collected at block 712 may be transmitted to a headend system along with other metrology information for generation of bills associated with resource consumption at the premises 106. In additional examples, this information may be used to adjust control of the consumption at the premises 106 during future peak management periods.

At block 714, the process 700 involves determining if the peak management period is still active. In some examples, the peak management period may continue for a preset period of time. In additional examples, the peak management period may stop with the peak management system 102 transmits an additional signal to cancel the peak management period (e.g., when a critical resource period is determined to be over). If the peak management period is still active, then the process 700 may return to block 708 to determine if the peak resource consumption period 402 is active. If the peak management period is no longer active, then the process 700 may return to block 706 to await an additional peak management period signal to initiate the peak resource management schedule 400 at the premises 106. When the process 700 returns to block 706 to await the additional peak management period signal, the process 700 may further include controlling the premises 106 to resume a standard consumption level.

If, at block 708, a determination is made that the peak resource consumption period 402 is not active, then, at block 716, the process 700 involves controlling the energy consumption at the premises 106 to below a limited consumption level limit established by the limited resource consumption period 404 of the peak resource management schedule 400. The process 700 may then return to block 712 to calculate incentives and costs associated with resource generation or consumption at the premises 106.

Figure 8:
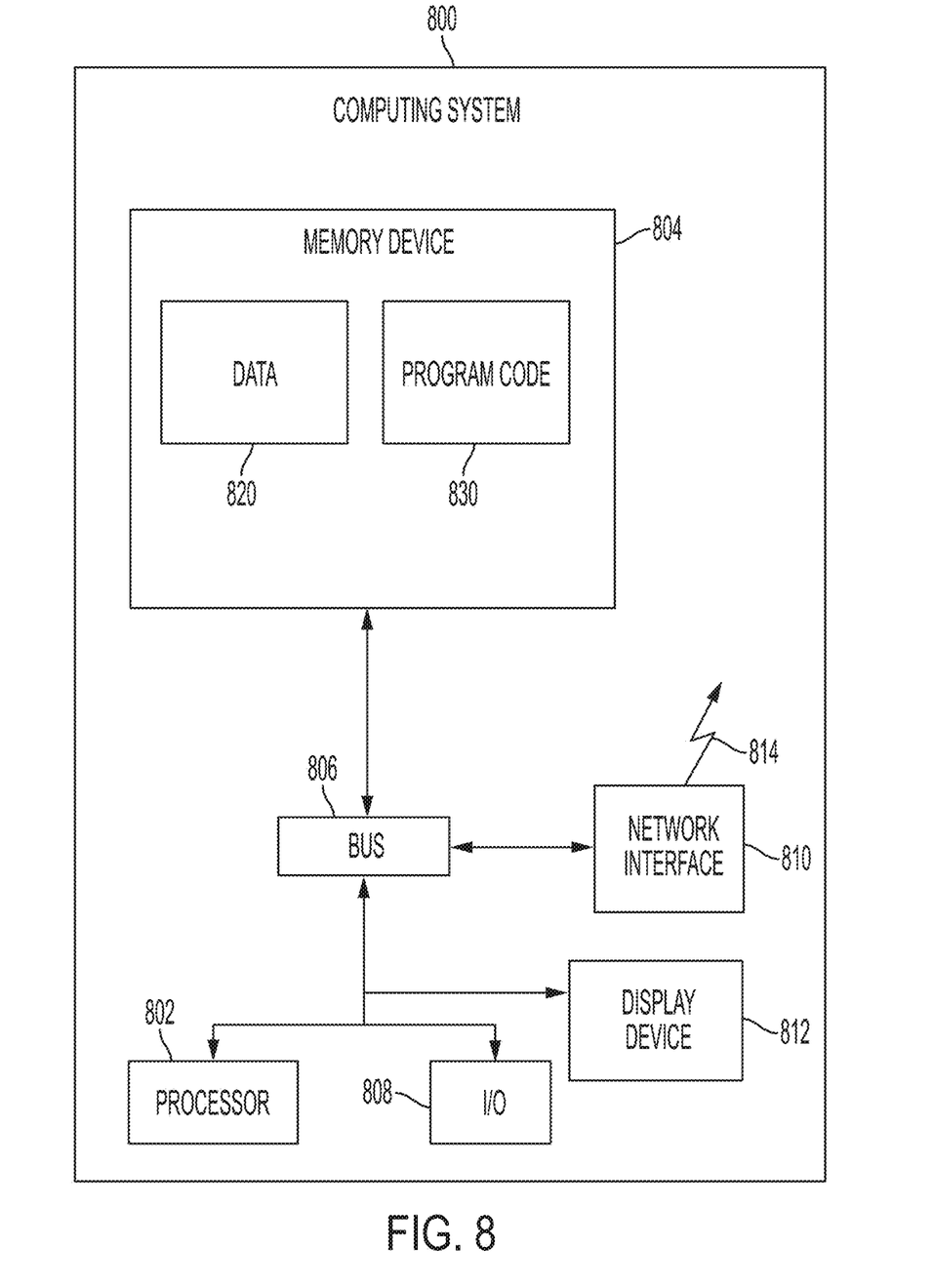
FIG. 8 is an exemplary computing device used for peak resource management, according to some implementations described herein.

FIG. 8 illustrates an exemplary computing device used for managing premises consumption of a resource during a period of peak consumption, according to some implementations described herein. Any suitable computing system may be used for performing the operations described herein. The depicted example of a computing device 800 includes a processor 802 communicatively coupled to one or more memory devices 804. The processor 802 executes computer-executable program code 830 stored in a memory device 804, accesses data 820 stored in the memory device 804, or both. Examples of the processor 802 include a microprocessor, an application-specific integrated circuit ("ASIC"), a field-programmable gate array ("FPGA"), or any other suitable processing device. The processor 802 can include any number of processing devices or cores, including a single processing device. The functionality of the computing device may be implemented in hardware, software, firmware, or a combination thereof.

The memory device 804 includes any suitable non-transitory computer-readable medium for storing data, program code, or both. A computer-readable medium can include any electronic, optical, magnetic, or other storage device capable of providing a processor with computer-readable instructions or other program code. Non-limiting examples of a computer-readable medium include a flash memory, a ROM, a RAM, an ASIC, or any other medium from which a processing device can read instructions. The instructions may include processor-specific instructions generated by a compiler or an interpreter from code written in any suitable computer-programming language, including, for example, C, C++, C#, Visual Basic, Java, or scripting language.

The computing device 800 may also include a number of external or internal devices, such as input or output devices. For example, the computing device 800 is shown with one or more input/output ("I/O") interfaces 808. An I/O interface 808 can receive input from input devices or provide output to output devices. One or more busses 806 are also included in the computing device 800. The bus 806 communicatively couples one or more components of a respective one of the computing device 800.

The computing device 800 executes program code 830 that configures the processor 802 to perform one or more of the operations described herein. For example, the program code 830 causes the processor to perform the operations described in FIGS. 1-7.

The computing device 800 also includes a network interface device 810. The network interface device 810 includes any device or group of devices suitable for establishing a wired or wireless data connection to one or more data networks. The network interface device 810 may be a wireless device and have an antenna 814. The computing device 800 can communicate with one or more other computing devices implementing the computing device or other functionality via a data network using the network interface device 810. In some examples, the interface device 810 may provide cellular network communication functionality, mesh network communication functionality, or any other communication functionalities for the computing device 800.

The computing device 800 can also include a display device 812. Display device 812 can be a LCD, LED, touchscreen or other device operable to display information about the computing device 800. For example, information could include an operational status of the computing device, network status, etc.

In an example, the computing device 800 may form part of a metering device, such as the metering device 108. In such an example, the data 820 stored in the memory device 804 may include metrology data. Further, the program code 830 may include program code that is accessible by the processor 802 to perform metrology operations associated with the metering device 108.

While the present subject matter is described in detail with respect to specific aspects thereof, it will be appreciated that those skilled, upon attaining an understanding of the foregoing and the following, may readily produce alternations to, variations of, and equivalents to such aspects. Accordingly, it should be understood that the present disclosure has been presented for purposes of example rather than limitation and does not preclude inclusion of such modifications, variations, and/or additions to the present subject matter as would be readily apparent to one of ordinary skill in the art.

What is claimed is:

1. A system comprising:
a metering device, including a distributed energy resource (DER) port, configured to meter resource generation by one or more DER components;
a smart panel configured to control application of power to a plurality of devices;
a processor; and
a non-transitory, computer-readable memory that includes instructions executable by the processor for causing the processor to:
access a peak resource management schedule;
receive a peak resource management signal comprising instructions to commence execution of the peak resource management schedule at a premises;
control the metering device to monitor premises resource consumption at the premises;
determine that a peak resource consumption portion of the peak resource management schedule is active;

in response to determining that the peak resource consumption portion is active, control the premises resource consumption at the premises to an amount that is less than a peak resource consumption level of the peak resource management schedule, the controlling the premises resource consumption at the premises comprising controlling the application of power by the smart panel to the plurality of devices;

determine that a limited resource consumption portion of the peak resource management schedule is active; and in response to determining that the limited resource consumption portion is active, control the premises resource consumption at the premises to an amount that is less than a non-zero, limited resource consumption level of the peak resource management schedule.

2. The system of claim 1, where the peak resource management schedule comprises:

a first peak consumption period and a first limited resource consumption period for a first premises associated with the metering device, where a second peak consumption period and a second limited resource consumption period for a second premises associated with a second metering device are different from the first peak consumption period and the second peak consumption period.

3. The system of claim 2, where the first peak consumption period and the second peak consumption period do not overlap by more than 10% of either the first or second peak consumption period.

4. The system of claim 1, where the instructions are further executable by the processor for causing the processor to:

receive incentive information associated with controlling the premises resource consumption to an amount that is less than a specified level;

receive premium cost information associated with controlling the premises resource consumption to above the specified level; and control the premises resource consumption using the incentive information and the premium cost information.

5. The system of claim 1, where the peak resource consumption portion enables the premises resource consumption to be an amount that is twice the amount of premises resource consumption during the limited resource consumption portion, or more than twice the amount of premises resource consumption during the limited resource consumption portion.

6. The system of claim 1, where controlling the premises resource consumption to an amount that is less than the non-zero, limited resource consumption level of the peak resource management schedule comprises:

assigning priority levels to a plurality of resource consuming devices; and instructing a subset of the plurality of resource consuming devices with a lowest priority level of the priority levels to reduce resource consumption.

7. The system of claim 1, where the premises comprises a portion of a microgrid system, a first controller of the microgrid system receives a microgrid resource management schedule from a second controller of a resource distribution network, and the first controller of the microgrid system is configured to provide the peak resource management schedule to each premises of the microgrid system based on the microgrid resource management schedule.

8. A non-transitory, computer-readable medium comprising instructions that are executable by a processor for causing the processor to perform operations comprising:

accessing a peak resource management schedule;

receiving a peak resource management signal comprising instructions to commence execution of the peak resource management schedule at a premises;

controlling a metering device to monitor premises resource consumption at the premises;

determining that a peak resource consumption portion of the peak resource management schedule is active;

in response to determining that the peak resource consumption portion is active, controlling the premises resource consumption at the premises to an amount that is less than a peak resource consumption level of the peak resource management schedule, where controlling the premises resource consumption at the premises comprises controlling an application of power by a smart panel to a plurality of devices;

determining that a limited resource consumption portion of the peak resource management schedule is active; and in response to determining that the limited resource consumption portion is active, controlling the premises resource consumption at the premises to an amount that is less than a non-zero, limited resource consumption level of the peak resource management schedule.

9. The non-transitory, computer-readable medium of claim 8, where the peak resource management schedule comprises:

a first peak consumption period and a first limited resource consumption period for a first premises associated with the metering device, where a second peak consumption period and a second limited resource consumption period for a second premises associated with a second metering device are different from the first peak consumption period and the second peak consumption period.

10. The non-transitory, computer-readable medium of claim 9, where the first peak consumption period and the second peak consumption period do not overlap by more than 10% of either the first or second peak consumption period.

11. The non-transitory, computer-readable medium of claim 8, the operations further comprising:

receiving a second peak resource management signal comprising instructions to cancel the peak resource management schedule at the premises; and in response to receiving the second peak resource management signal, controlling the premises to resume a standard resource consumption level.

12. The non-transitory, computer-readable medium of claim 8, where the operation of controlling the premises resource consumption to the amount that is less than the non-zero, limited resource consumption level of the peak resource management schedule comprises:

instructing one or more resource consuming devices to reduce resource consumption to a zero level or to a non-zero level, where the non-zero level comprises a reduction from a peak consumption level of the one or more resource consuming devices.

13. The non-transitory, computer-readable medium of claim 8, where the instructions to commence the execution of the peak resource management schedule at the premises further comprise a particular time in which each premises that is assigned the peak resource management schedule is to commence the execution of the peak resource management schedule.

* * * * *